United States Patent
Wiesner et al.

(10) Patent No.: US 10,756,370 B2
(45) Date of Patent: Aug. 25, 2020

(54) METHOD FOR POWER CONTROL OF A FUEL CELL SYSTEM IN A VEHICLE

(71) Applicant: Daimler AG, Stuttgart (DE)

(72) Inventors: Peter Wiesner, Kirchheim (DE); Sven Schmalzriedt, Esslingen (DE)

(73) Assignee: Daimler AG, Stuttgart (DE)

(*) Notice: Subject to any disclaimer, the term of this patent is extended or adjusted under 35 U.S.C. 154(b) by 287 days.

(21) Appl. No.: 15/565,042

(22) PCT Filed: Mar. 2, 2016

(86) PCT No.: PCT/EP2016/000360
§ 371 (c)(1),
(2) Date: Oct. 6, 2017

(87) PCT Pub. No.: WO2016/162101
PCT Pub. Date: Oct. 13, 2016

(65) Prior Publication Data
US 2018/0108928 A1    Apr. 19, 2018

(30) Foreign Application Priority Data

Apr. 9, 2015  (DE) .......................... 10 2015 004 677

(51) Int. Cl.
*H01M 8/04537* (2016.01)
*H01M 8/04746* (2016.01)
(Continued)

(52) U.S. Cl.
CPC ......... *H01M 8/04992* (2013.01); *B60L 50/72* (2019.02); *H01M 8/0491* (2013.01);
(Continued)

(58) Field of Classification Search
CPC ......... H01M 8/04395; H01M 8/04619; H01M 8/04753; H01M 8/0491; H01M 8/0494;
(Continued)

(56) References Cited

U.S. PATENT DOCUMENTS

| 5,780,981 A | 7/1998 | Sonntag et al. |
| 2008/0070073 A1* | 3/2008 | Petersen ........... H01M 8/04365 429/431 |

(Continued)

FOREIGN PATENT DOCUMENTS

| DE | 195 40 824 A1 | 5/1997 |
| DE | 11 2008 000 986 B4 | 2/2010 |

(Continued)

OTHER PUBLICATIONS

PCT/EP2016/000360, International Search Report dated May 6, 2016 (Three (3) pages).
German Office Action issued in corresponding German patent application 10 2015 004 677.2, dated Nov. 27, 2015 (Six (6) pages).

*Primary Examiner* — Anshul Sood
(74) *Attorney, Agent, or Firm* — Crowell & Moring LLP

(57) ABSTRACT

A method for power control of a fuel cell system in a vehicle is disclosed. The requested fuel cell system power by the vehicle is converted into a power request made of the fuel cell by an expected power of auxiliary drives of the fuel cell system at the requested fuel cell system power being added to the requested fuel cell system power. A media supply of the fuel cell which corresponds to the power request made of the fuel cell is requested. The electrical loading of the fuel cell with current is performed in accordance with a model of the cathode dynamics such that a control variable of the control operation is matched to the media dynamics, and the power release is performed such that the fuel cell is loaded only when the adequate media supply is ensured.

9 Claims, 2 Drawing Sheets

(51) Int. Cl.
*H01M 8/04992* (2016.01)
*H01M 8/04828* (2016.01)
*H01M 8/0438* (2016.01)
*H01M 8/04858* (2016.01)
*B60L 50/72* (2019.01)
*H01M 8/0432* (2016.01)

(52) U.S. Cl.
CPC ..... *H01M 8/0494* (2013.01); *H01M 8/04395* (2013.01); *H01M 8/04619* (2013.01); *H01M 8/04626* (2013.01); *H01M 8/04753* (2013.01); *H01M 8/0432* (2013.01); *H01M 8/0438* (2013.01); *H01M 8/04604* (2013.01); *H01M 2250/20* (2013.01); *Y02T 90/32* (2013.01); *Y02T 90/34* (2013.01)

(58) Field of Classification Search
CPC .... H01M 2250/20; B60L 50/72; Y02T 90/32; Y02T 90/34
See application file for complete search history.

(56) References Cited

U.S. PATENT DOCUMENTS

| | | | |
|---|---|---|---|
| 2008/0076012 A1* | 3/2008 | Lienkamp | H01M 8/04552 429/65 |
| 2010/0068567 A1 | 3/2010 | Imai et al. | |
| 2010/0316926 A1* | 12/2010 | Ishikawa | H01M 8/04201 429/444 |
| 2011/0217608 A1 | 9/2011 | Matsumoto et al. | |
| 2014/0255810 A1 | 9/2014 | Lenz et al. | |
| 2017/0214069 A1* | 7/2017 | Hoshi | H01M 8/04029 |

FOREIGN PATENT DOCUMENTS

| | | |
|---|---|---|
| DE | 10 2013 021 538 A | 6/2014 |
| DE | 102013021538 A * | 6/2014 |
| DE | 10 2014 100 703 A1 | 9/2014 |
| EP | 0 771 688 A1 | 5/1997 |
| EP | 2 001 070 B1 | 12/2008 |
| JP | 2006 019 210 A | 1/2006 |

* cited by examiner

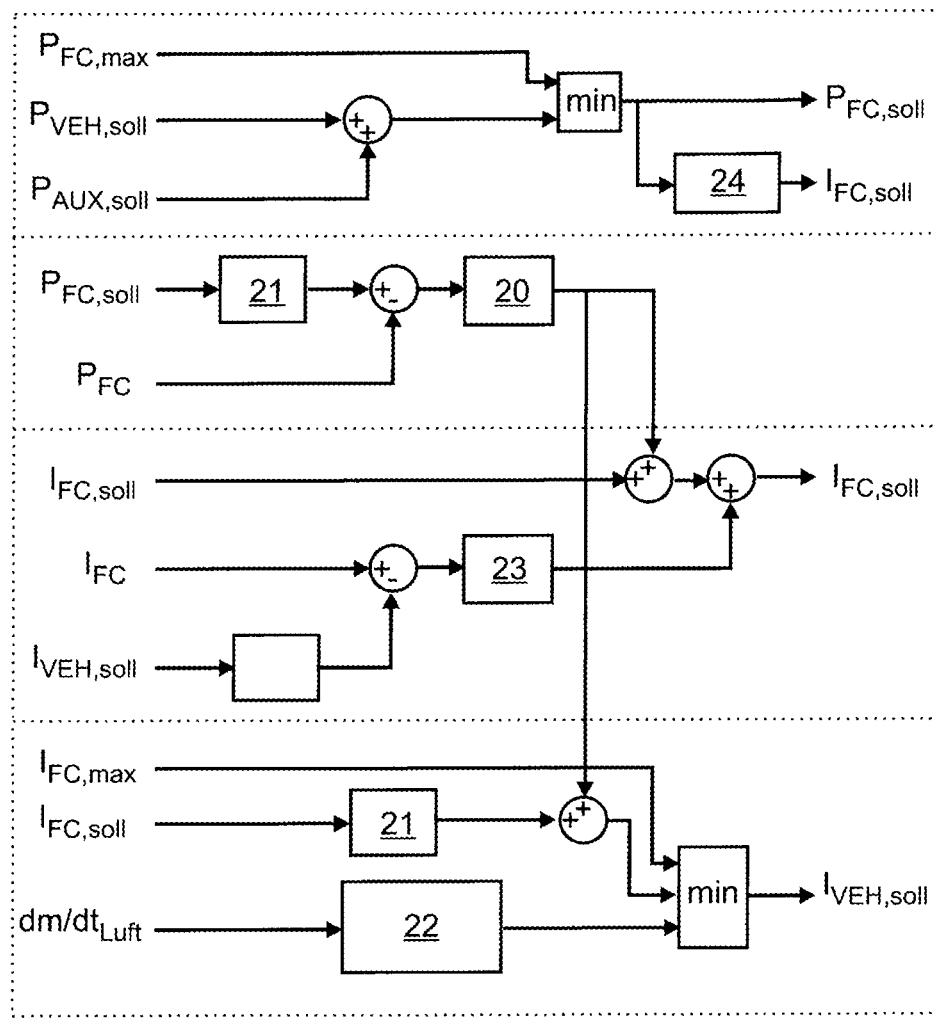
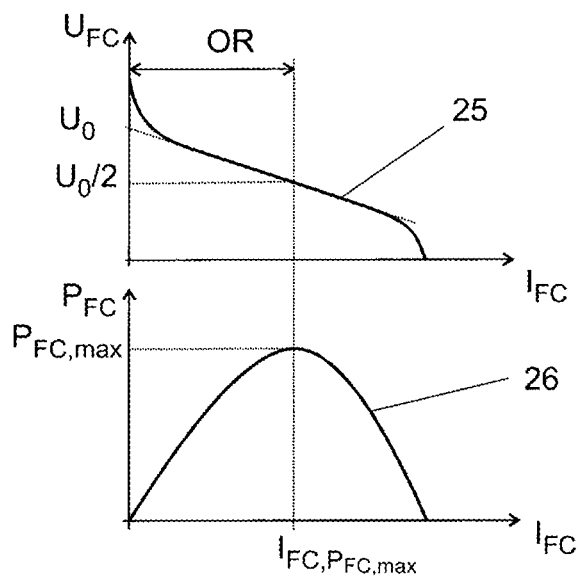
Fig. 3
Fig. 4

METHOD FOR POWER CONTROL OF A FUEL CELL SYSTEM IN A VEHICLE

BACKGROUND AND SUMMARY OF THE INVENTION

The invention relates to a method for power control of a fuel cell system in a vehicle.

A vehicle with a fuel cell system, which is frequently also designated as a fuel cell vehicle, usually consists of a fuel cell system as an energy cell, an electrical energy storage device, generally in the form of a battery, as well as an electrical drive unit which comprises at least one electric motor. In the drive unit the electric motor takes up electrical power and is typically operated as a generator during braking of the vehicle and in this so-called recuperation operation feeds back electrical power, which can then be stored in the electrical energy storage device.

In order to be able to drive such a fuel cell vehicle in the desired manner, typically a torque necessary for the associated required acceleration and accordingly a specific electrical power is determined by means of a driver input, for example the position of an accelerator pedal. In this case for the energy management of the drive system it is necessary for the requested electrical power to be provided by the fuel cell system with sufficient precision and in reproducible behavior, if possible within predetermined dynamics, and sufficiently quickly overall. For the energy management of the drive system, substantial overshoots or undershoots of the power of the fuel cell system are not acceptable. Moreover, by means of the power control it must be ensured that the fuel cell is operated in the allowed power range and a sufficient supply of media for precisely this power range is guaranteed.

Various control methods are known from the prior art. Thus, for example, according to the general prior art it is provided that the power required by the drive system is drawn immediately from the fuel cell or the fuel cell system. Since, typically, in particular in the event of a sudden increase in the power required, the media have not yet adapted to the new working point or, because of the typically necessary flow path, have not yet reached the fuel cell, constitutes a disadvantage. The media supply can be reset with reference to a measurement of the current of the load, but this leads to an extreme loading of the fuel cell, on the one hand, and to extraordinarily poor dynamics of a fuel cell vehicle operated in such a way, on the other hand.

An alternative is described in DE 11 2008 000 986 T5. In this document the structure is not controlled by means of the current but by means of the voltage. The problem with the media supply also arises here, and the dynamics is correspondingly restricted. A further possibility in which the focus is on optimization of the overall efficiency is described, for example, in EP 2 001 070 B1. However, with this structure, due to the optimization of the efficiency, the dynamics which is crucial in particular for vehicle drives is likewise not very good, which in this case constitutes a serious disadvantage.

Such a structure is known for example from US 2011/0217608 A1. In the variant described there the ultimate objective is a limitation of the maximum current, which is comparatively innocuous at least for the operation of the fuel cell and does not load the fuel cell more than is necessary. However, here too the media supply is not taken into consideration or is considered only indirectly, so that this structure also suffers from the disadvantages referred to above, in particular comparatively poor dynamics, which is, however, highly relevant for vehicle applications.

The object of the present invention is to provide a method for power control of a fuel cell system in a vehicle, which advantageously modifies the method known from the prior art, and which in particular enables a very good and reproducible control behavior with high power dynamics.

The method according to the invention for power control of a fuel cell system in a vehicle, unlike the method according to the prior art, considers a power request made of the fuel cell which, in addition to the requested fuel cell system power by the vehicle, also takes into consideration the power of auxiliary drives of the fuel cell system required in the expected working point. By taking the power required by the auxiliary drives—such as, in particular the air compressor—into consideration in this way, the power request can be implemented very precisely and highly dynamically. In this case the electrical loading of the fuel cell with current is performed in accordance with a model of the cathode dynamics in such a way that the control variable of the control operation is matched to the media dynamics. As a result it is ensured that, as dynamically as possible, the power required from the fuel cell is always only the power which can also be supplied by the fuel cell on the basis of the dynamics of the media supply predicted in accordance with a model. As a result inaccuracies in the control, such as for example undershoots or overshoots, can be largely avoided, since at the time of the power release the fuel cell is capable of supplying the required power, so that a high control quality and a very reproducible behavior is achieved. In this case everything functions with a very high fuel cell dynamics, specifically with the highest fuel cell dynamics that is possible without overloading the fuel cell and thus ultimately both damaging the fuel cell and also reducing the control quality.

With a power interface between the vehicle and the fuel cell system with good control quality, the setup enables good and high accuracy of the provision of power. At the same time the maximum conceivable dynamics, which is only in practice by the available dynamics of the media supply, can be produced.

In this case a very advantageous further embodiment of the method according to the invention provides that the power to be expected from auxiliary drives of the fuel cell system is determined by means of a characteristic field as a function of at least one of the variables power, pressure and/or temperature. Such a characteristic field, preferably a characteristic field in which the expected power of the auxiliary drives can be determined as a function of all three aforementioned variables, is a particularly simple and efficient type for predicting the power of the auxiliary drives to be expected in the target point of the power control. It can then be added very simply by computation to the fuel cell system power requested by the vehicle, in order to receive the actual expected power request made to the fuel cell system in the target region of the power control.

Since specific parameters in this above-mentioned characteristic field can typically be varied by means of the duration of operation of the fuel cell system or of the vehicle, for example through ageing effects, through wear, through leakages or the like which occur, according to a particularly advantageous further embodiment of the idea, the characteristic field can be re-adapted in the static operation of the fuel cell system in order to, even over a relatively long period of operation of the fuel cell system, obtain the best possible prediction of the expected power of the auxiliary drives and thus to maintain a high quality of control.

In the case of the request for the media supply, according to an advantageous further embodiment of the idea underlying the invention, the pressure as well as the mass flow or volume flow of the respective medium is predetermined. As a result, in the method according to the invention the media can be provided as precisely as possible in the desired manner with correspondingly high dynamics.

A further very advantageous embodiment of the method according to the invention also provides that the request for the media supply takes place on the basis of a current setpoint of the power request made of the fuel cell. Such a current setpoint is particularly suitable for controlling or pre-controlling the media supply. In particular in the case of the "cold" combustion in the fuel cell the quantity of substance in the media supply and the electrical current are directly linked. Thus a simple and efficient control of the media supply can be implemented by means of the current setpoint which is very easy to determine from the power values.

Typically the correlation between the current and the voltage and thus ultimately also between the current and the power in a fuel cell is predetermined by the so-called characteristic or polarization curve of the fuel cell. This is subject to corresponding fluctuations under the respective boundary conditions which can change dynamically. Ultimately, however, it may be used in order to determine the current setpoint as exactly as possible from the power request made of the fuel cell.

In order to reduce the computational complexity when determining the current setpoint from the polarization curve of the fuel cell and to make the method correspondingly simple and quick, according to a very advantageous further embodiment of the idea underlying the invention it may be provided that for this purpose the polarization curve is approximated linearly under at least one predetermined boundary condition. Such a linear approximation of the polarization curve of a fuel cell under at least one boundary condition is described in German application DE 10 2013 021 538.2 (which was not prior published) and can be used here analogously in order very quickly and with sufficiently high accuracy to determine the current setpoint from the polarization curve or by means of the polarization curve from the power request made of the fuel cell. The method necessary for this is described in detail in the aforementioned, not prior published document and therefore does not need to be referred to in detail again.

Furthermore, a further advantageous embodiment of the method according to the invention provides that the air mass flow to the cathode is measured and the current setpoint is limited on the basis of the measured air mass flow. The currently prevailing state can be assessed very well by such a measurement of the air mass flow. A limitation of the current setpoint makes it possible, for example, to react to problems in the region of the air supply, in particular to such problems in which no sufficient air mass flow can be provided by the air compressor, since the working point of the compressor is above the surge limit due to a higher pressure drop than usual, for example due to a blocked air filter or the like. In this case the current setpoint value and thus, according to the advantageous further embodiment described above, the media supply controlled thereby is limited to a maximum value corresponding to the actual air mass.

Moreover, a further very advantageous embodiment of the method according to the invention provides that it is ensured, for example by means of a further controller, that the current setpoint passed to the media supply is adapted to the current value drawn from the fuel cell if the vehicle does not take off the current or does not take it off completely. This may happen, for example, if the vehicle is in recuperation mode or, because of a traffic situation, changes dynamically from an acceleration mode into propulsion mode and therefore the power of the fuel cell system can no longer be taken off. Thus in this case the current setpoint is adapted by means of the power control according to the described advantageous further embodiment.

A further particularly advantageous embodiment of the method according to the invention can additionally provide, for all previously described variants of the method, that the current setpoint transmitted to the media supply and/or a setpoint for the current load of the fuel cell are limited in such a way that the permitted operating range of the fuel cell, starting from the point of maximum power on the polarization curve, is in the direction of higher current intensities or in the direction of lower current intensities, preferably in the direction of lower intensities. Thus the operating range of the fuel cell is correspondingly restricted, typically so that the current intensity may fluctuate between zero and the respective current intensity occurring at the point of maximum power. The curve of the fuel cell power over the current is typically a parabola which is open downwards with the maximum power at the maximum point thereon. With a control it can happen that without the corresponding limitation of the power control or of the operating range of the fuel cell either to the sections on the left or the right of the maximum, two different solutions exist for the requested fuel cell system power. In this case the power control would not be stable, so that the corresponding limitation of the working range of the fuel cell ensures a reliable and stable control in said manner.

Moreover, further advantageous embodiments of the method according to the invention are disclosed by the exemplary embodiment which is described in greater detail below with reference to the drawings.

BRIEF DESCRIPTION OF THE DRAWINGS

FIG. 3 shows the internal power control of the fuel cell system in a schematic overall view; and FIG. 4 shows a current/voltage and current/power diagram of the fuel cell for illustration of the limitation of the working range of the power control.

DETAILED DESCRIPTION OF THE DRAWINGS

Figure 1:
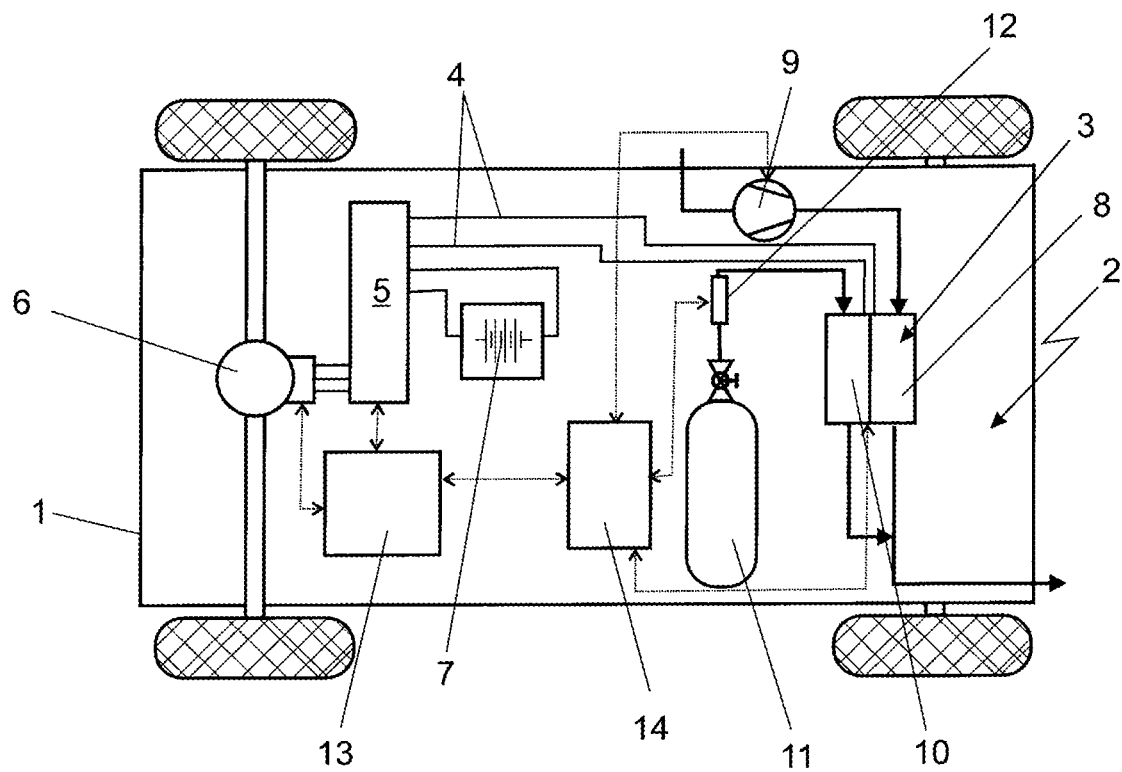
FIG. 1 shows schematically a vehicle with a fuel cell system.

In the illustration shown in FIG. 1 a vehicle 1 with a fuel cell system 2 is indicated highly schematically. The fuel cell system 2 has a fuel cell 3 which supplies the electrical power 4 generated by it via a power electronics unit designated by 5 to a drive motor 6 and a battery 7. The vehicle 1 is driven by means of the drive motor 6. The fuel cell 3 itself, which in particular can be set up as a so-called fuel cell stack in PEM technology, has a common cathode compartment 8 illustrated here by way of example and simply, which is supplied with air as oxygen supplier by means of an air compressor 9. Hydrogen from a compressed gas storage tank 11 is supplied by means of a pressure regulating and metering unit 12 to an anode compartment, designated by 10, of the fuel cell 3. This structure of the fuel cell system 2 is illustrated in a very highly simplified manner. However, the person skilled in the art is aware that it is not necessary to go into any further detail in relation to this. Of course, it is also clear to the person skilled in the art that further details, such as for example a circuit for the anode recirculation, humidifier, exhaust air turbine, charge air cooler and the like can be provided, as required, in the fuel cell system 2.

In a control and regulation system for the vehicle 1 and the fuel cell system 2, a vehicle control device designated by 13 as well as a fuel cell control unit designated by 14 are illustrated purely by way of example in the representation in FIG. 1.

Figure 2:
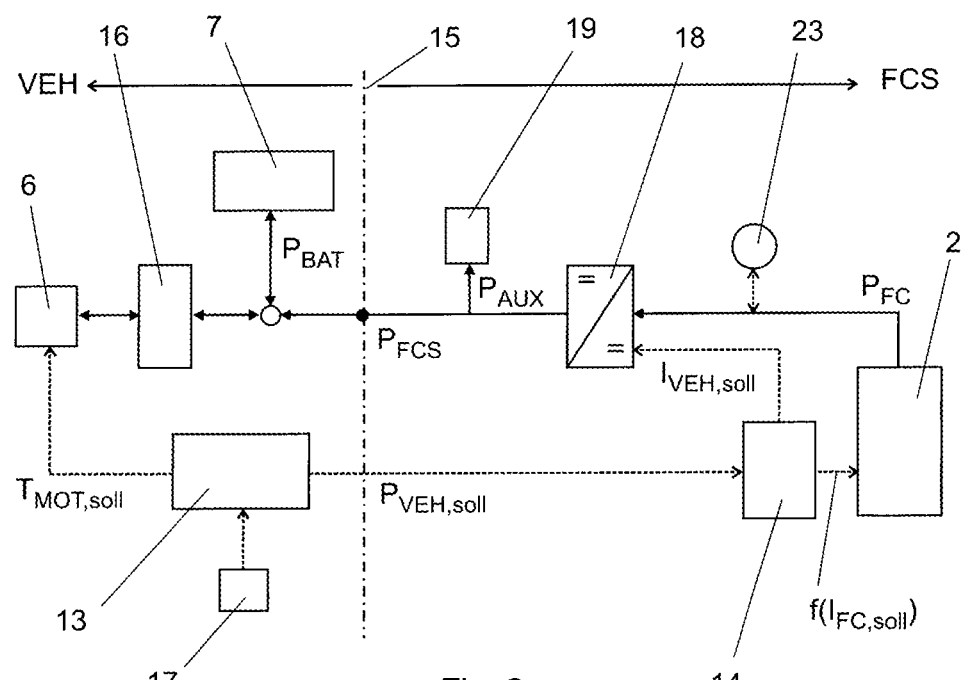
FIG. 2 shows an exemplary control circuit with the high-voltage topography in the method according to the invention.

Details of this structure of the control unit or regulating unit of the vehicle 1 and/or of the fuel cell system 2 can be seen in FIG. 2. In this case the control on the vehicle side, which is located to the left of the broken line 15, and the control on the fuel cell system side, which is located to the right of the line 15, is illustrated by way of example by means of dash-dot line designated by 15. The abbreviation VEH is used for the vehicle and the abbreviation FCS is used for the fuel cell system 2. In this case the broken lines show the flow of information, and the solid lines show the flow of power within the structure. In addition to the aforementioned control devices 13, 14, on the vehicle side VEH it is additionally possible to see the drive motor designated here by 6, as well as an inverter designated by 16 as part of the power electronics unit 5, can be seen. Moreover the high-voltage battery 7 is illustrated in the representation. The start for the power control is typically provided by a driver of the vehicle 1, which is designated by the box designated by 17. By the position of an accelerator pedal effected by the driver, for example, a corresponding acceleration request is generated, which is then supplied to the vehicle control device 13 and is implemented accordingly thereby. The driver-initiated requirement for acceleration or also relief of the pressure on the accelerator pedal after reduced acceleration, or actuation of a brake pedal after deceleration is converted into a torque TMOT,soll with a plus or minus sign and is correspondingly supplied to the drive motor 6. If, for example, an acceleration of the vehicle is required by the driver 17, the electrical power necessary in order to provide the required torque TMOT,soll must be provided by the fuel cell system 2. For this, a corresponding fuel cell system power PVEH,soll is requested by the vehicle 1 from the fuel cell system 2. The control device 14 of the fuel cell system 2 must then process this accordingly, in order to be able to transfer the required power PFCS to the vehicle system or ultimately to the drive motor 6. Thus the system VEH on the vehicle side and the fuel cell system FCS communicate via a power interface. Since power or power values are "exchanged" between the systems, such a power interface is very simple and efficient.

For the energy management of the vehicle 1 it is necessary for the requested fuel cell system power PVEH,soll to be provided with sufficient precision and with reproducible behavior, within a defined dynamics. For the vehicle 1, for example, substantial overshoots or undershoots of the supplied power PFCS of the fuel cell system 2 are not acceptable. Moreover, the power control should ensure that the fuel cell 3 is only operated in the permitted power range. Therefore the working range of the power control should be limited in a manner explained in greater detail below to the rising power branch of the fuel cell power. Moreover, the permitted working range of the components of the fuel cell system 2 also should not be exceeded, in particular with regard to current and voltage.

In the illustration in FIG. 3 the control with its essential features is illustrated schematically inside the fuel cell system 2, and thus ultimately in the control device 14 of the fuel cell system 2. In this case the control is subdivided into four sections arranged one below the other. The upper part-region deals with the prediction of current and power of the fuel cell, and the region arranged below it shows the actual fuel cell power controller. Below this can be found the region by means of which a setpoint for the media supply of the fuel cell 3 is generated. In the lowest region of the illustration in FIG. 4, a setpoint for the current is determined on a DC/DC converter 18 of the fuel cell system 2 which can be seen in FIG. 2. The following description relates in each case to the FIGS. 2 and 3, which are interrelated with regard to their functionalities.

After a power is requested by the vehicle 1, the power control of the fuel cell system 2 requests the media supply of the fuel cell 3. For this, typically, a hydrogen mass flow as well as an anode pressure and an air mass flow dm/dtLuft as well as a cathode pressure is requested according to the fuel cell system power PVEH,soll requested by the vehicle 1. This request for the media is actually made by means of a current setpoint IFC,soll since in the case of cold combustion in the fuel cell 3 the quantity of substance in the media supply corresponds to an electrical current. The current setpoint IFC,soll for forwarding to the media supply, which can in particular comprise the anode supply and the cathode supply, but also a supply of the fuel cell 3 and/or other components of the fuel cell system 2 with cooling medium and the like, is calculated and passed on directly and without delay for the expected load point in the target region of the control, in order to obtain the required high dynamics of the fuel cell system 2.

The modules used for the media supply, in particular the air compressor 9 and the pressure regulating and metering unit 12, then set the media supply on the fuel cell 3 based upon the current setpoint IFC,soll. In this case the current setpoint IFC,soll to the media supply is calculated starting from the fuel cell system power PVEH,soll requested by the vehicle 1. For the computation of the current setpoint IFC,soll for forwarding to the media supply, the requested fuel cell system power PVEH,soll must be converted into a power request PFC,soll made of the fuel cell 3, in that a predicted power or a power PAUX,soll of auxiliary drives 19 to be expected in the target load region, in particular of the air compressor 9 as highest-power auxiliary drive, of the fuel cell system 2, is added to the requested fuel cell system power PVEH,soll. The expected auxiliary drive power PAUX,soll is stored in a load-dependent, pressure-dependent and temperature-dependent characteristic field, which can be re-adapted in stationary operation, in order to compensate for deviations occurring over time and/or to adapt a characteristic field, which is fixed and predefined at the start of operation, as precisely as possible to the real system, together with its tolerances.

Subsequently the power request PFC,soll made to the fuel cell 3 and received in this way is converted in the routine designated by 24 into the current setpoint IFC,soll to be provided by the fuel cell 3, which is then transmitted to the media supply. The recalculation of fuel cell power into fuel cell current can take place in principle by means of a current-voltage characteristic of the fuel cell 3, the so-called polarization curve, which is sometimes also designated as the pole curve. Since an exact knowledge of the polarization curve at the respective time is not generally available, the recalculation should be carried out here preferably by means of an adapted linear polarization curve. Similarly to the method explained in DE 10 2013 021 538.2, the polarization curve, which is shown in the upper diagram in FIG. 4 and is designated by 25, should be approximated under at least one predetermined condition by means of a linear function. This is described comprehensively in said document. If the linear adaptation there is used as a basis, then for the voltage UFc of the fuel cell 3 the following correlation is obtained:

$$UFC = U0 - (IFC*R)$$

In this case U0 represents the open circuit voltage of the fuel cell 3 and R represents the electrical resistance of the fuel cell 3. Similarly to the previous nomenclature, the current of the fuel cell 3 is designated by IFC. Similarly, the fuel cell power PFC can now also be calculated, for which the following correlation is produced:

$$PFC = (IFC2*R) + IFC*U0$$

In this case it is clear that the same correlation must apply for the actual values set out in the two said formulae and for the corresponding target values. Thus if instead of the fuel cell current IFC the current setpoint IFC,soll is set, the corresponding setpoint PFC,soll must also be used for the power PFC. If the correlation is solved according to the current setpoint IFC,soll, this produces the following basis for calculation for the current setpoint IFC,soll on the basis of the power request PFC,soll made of the fuel cell 3:

$$I_{FC,soll} = \frac{U_0 - \sqrt{U_0^2 + 4 \cdot R \cdot P_{FC,soll}}}{2 \cdot R}$$

In order to achieve a very reproducible provision of power, the loading of the fuel cell 3 takes place with current in accordance with a model. For this purpose a value for the current release IVEH,soll is determined and the current IFC from the fuel cell 3 can then be released by means of a DC/DC converter 18 of the fuel cell system 2, as part of the power electronics unit 5. In practice the supply of the cathode 8 with air mass and pressure is the limiting factor in the fuel cell dynamics. Therefore a model 21 forming the basis of the simulation is based on a simulation of the cathode dynamics.

The power control additionally ensures that, when the supply of the fuel cell 3 is unexpectedly no longer provided, the electrical loading of the fuel cell 3 is withdrawn. For this limitation the air mass flow dm/dtLuft to the cathode compartment 8 is measured and from this a target current value IFC,dm/dt_Luft to be achieved with this air mass flow dm/dtLuft is determined (box 22 in FIG. 3). Then the current setpoint IFC,soll is limited to the current value IFC,dm/dt_Luft corresponding to the air mass. This can take place, for example, if the air compressor 9 cannot provide any air mass, since the working point of the compressor is located under its surge limit due to a higher pressure drop than usual which may be caused, for example, by a blocked air filter.

In order that the fuel cell system 2 provides the requested fuel cell system power PVEH,soll with the required precision, the fuel cell power PFC,soll requested from the fuel cell 3 is adjusted by means of a power controller 20. On the other hand, an adjustment of the fuel cell system power PFCS is not possible since, for example, at the start of an upward power surge the auxiliary drives 19 and in particular the air compressor 9 require acceleration power and therefore in the first moment the fuel cell system power PFCS in fact drops, before the power rises again. Due to this behavior a phase shift of 180° occurs. Thus the control path is not regulatable. Therefore the control device 14 of the fuel cell system 2 intervenes as fuel cell controller in the current setpoint IFC,soll for the media supply and in the current release IVEH,soll. This is expedient since the provision of the media should match the fuel cell current IFC drawn from the fuel cell 3.

Since the fuel cell power PFC is adjusted by means of a PI controller, i.e., without a permanent control deviation, the accuracy of the fuel cell system power PFCS only depends upon the accuracy of the estimated expected power PAUX,soll of the auxiliary drives 19. Since the estimated auxiliary drive power can be adapted in a stationary manner by means of the characteristic field, a very good control accuracy is achieved.

In order to prevent overshoot or undershoot of the fuel cell system power PFCS, the dynamics of the setpoint of the fuel cell power PFC,soll of the power controller 20 is adapted to the dynamics of the media supply by means of the simulation of the cathode dynamics in the model 21. Thus it is ensured that the controller does not increase its 1-component, in the event of a setpoint change, which is quicker than the system dynamics. The 1-component only changes if the dynamically adapted setpoint PFC,soll,dyn is not precisely adjusted. Without such a dynamic adaptation of the setpoint PFC,soll,dyn, in the event of a jump in the setpoint the I-component of the controller would build up and then at the transition into the stationary load point would have to be reduced in the target region of the control. This would cause a transient response. Thus, due to the described procedure undershoots and overshoots of the fuel cell system power PFCS can be prevented.

A further controller 23 ensures that the current setpoint IFC,soll for the media supply is adapted to the fuel cell current IFC drawn from the fuel cell 3 when the current setpoint IFC,soll is not withdrawn from the vehicle system. This may be, for example, when the vehicle 1 is in the recuperation mode and therefore no power can be withdrawn from the fuel cell system 2.

The current setpoint IFC,soll for the media supply and the setpoint for the current release IVEH,soll are limited in the power control to a permitted working range OR. The power controller should limit the working range to the rising power branch of the fuel cell power PFC. In the illustration in FIG. 4, in the upper diagram the fuel cell voltage UFC and the fuel cell power PFC are in each case plotted in relation to the fuel cell current IFC. The upper curve designated by 25 constitutes the polarization curve or characteristic of the fuel cell 3 which has already been addressed a number of times. The lower curve designated by 26, which resembles a downwardly open parabola, shows the fuel cell power and is designated as the power curve. The maximum power PFC, max of the fuel cell 3 can now be established very simply on this power curve 26. This point can be transferred into the upper polarization curve 5. In the exemplary embodiment illustrated here, at this point U0/2 is obtained, that is to say half of the open circuit voltage U0. If a power control were now established which functions over the entire range of the polarization curve 5, then for a corresponding output value PFC there could be two solutions on the power curve 26, that is to say two different fuel cell flows IFC corresponding to this power. Therefore a power control would not be stable. However, as already mentioned, the working range OR should be correspondingly limited. In principle it would now be conceivable to limit this, both on the left and also on the right of the point of maximum power PFC,max, to the polarization curve 25. In practice, as shown at the top in the illustration in FIG. 4, the working range is limited to the range of the fuel cell current IFC between zero and the fuel cell current IFC(PFC,max) occurring at the maximum power PFC,max. Thus unnecessarily high current intensities are avoided. In addition the power control limits the current to the maximum component stream.

The invention claimed is:

1. A method for power control of a fuel cell system in a vehicle, comprising the steps of:
    providing fuel cell system power (PFCS) starting from a requested fuel cell system power (PVEH,soll) by the vehicle;
    wherein the requested fuel cell system power (PVEH,soll) is converted into a power request (PFC,soll) made of a fuel cell by adding an expected power (PAUX,soll) of auxiliary drives of the fuel cell system at the requested fuel cell system power (PVEH,soll) to the requested fuel cell system power (PVEH,soll);
    wherein a media supply of the fuel cell which corresponds to the power request (PFC,soll) made of the fuel cell is requested;
    wherein electrical loading of the fuel cell with current (IFC) is performed such that a power required from the fuel cell is always only a power which can be supplied by the fuel cell on a basis of dynamics of the media supply to the fuel cell as predicted by a model;
    and wherein the expected power (PAUX,soll) of the auxiliary drives of the fuel cell system is predicted by a characteristic field as a function of variables of power, pressure and temperature.

2. The method according to claim 1, wherein the characteristic field is re-adapted in a static mode of the fuel cell system.

3. The method according to claim 1, wherein, with respect to the request for the media supply, pressure and either mass flow or volume flow of a respective medium are predetermined.

4. The method according to claim 3, wherein the request for the media supply takes place on a basis of a current setpoint (IFC,soll) of the power request (PFC,soll) made of the fuel cell.

5. The method according to claim 4, wherein the current setpoint (IFC,soll) is determined by a polarization curve of the fuel cell from the power request (PFC,soll) made of the fuel cell.

6. The method according to claim 5, wherein the polarization curve is approximated linearly under at least one predetermined condition.

7. The method according to claim 5, wherein the current setpoint (IFC,soll) transmitted to the media supply and/or a setpoint for a current load of the fuel cell are limited such that a permitted operating range (OR) in a diagram of the polarization curve of the fuel cell, starting from a point of maximum power (PFC,max), is in a direction of higher current intensities or in a direction of lower current intensities (IFC).

8. The method according to claim 4, wherein air mass flow to a cathode is measured and the current setpoint (IFC,soll) is limited on a basis of the measured air mass flow.

9. The method according to claim 4, wherein the current setpoint (IFC,soll) passed to the media supply is adapted to a current value (IFC) drawn from the fuel cell if the vehicle does not take off the current or does not take off the current completely.

* * * * *